US011338498B2

(12) United States Patent
Huffer et al.

(10) Patent No.: US 11,338,498 B2
(45) Date of Patent: *May 24, 2022

(54) METHOD OF MAKING A PLASTIC FILM WITH INTEGRATED ZIPPER CLOSURE, AND PLASTIC BAG HAVING AN INTEGRATED ZIPPER CLOSURE

(71) Applicant: SONOCO DEVELOPMENT, INC., Hartsville, SC (US)

(72) Inventors: Scott William Huffer, Hartsville, SC (US); Jacob Donald Prue Branyon, Hartsville, SC (US)

(73) Assignee: SONOCO DEVELOPMENT, INC., Hartsville, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/150,062

(22) Filed: Jan. 15, 2021

(65) Prior Publication Data

US 2021/0129413 A1 May 6, 2021

Related U.S. Application Data

(62) Division of application No. 13/584,931, filed on Aug. 14, 2012, now Pat. No. 10,926,450.

(51) Int. Cl.
*B29C 53/36* (2006.01)
*B31B 150/00* (2017.01)
(Continued)

(52) U.S. Cl.
CPC ........ *B29C 53/36* (2013.01); *B29C 2053/362* (2013.01); *B31B 70/8131* (2017.08); *B31B 2150/00* (2017.08); *B31B 2160/102* (2017.08)

(58) Field of Classification Search
CPC ..... B31B 2150/00; B31B 70/74; B31B 70/81; B31B 70/813; B31B 70/8131; B65D 27/12; B65D 27/20; B29C 53/36
(Continued)

(56) References Cited

U.S. PATENT DOCUMENTS 4,235,653 A 11/1980 Ausnit
5,405,561 A 4/1995 Dais et al.
(Continued)

FOREIGN PATENT DOCUMENTS

EP 1132312 A2 9/2001
JP 2010195459 A 9/2010
(Continued)

OTHER PUBLICATIONS

International Search Report and Written Opinion for Application No. PCT/US2013/054668, dated Oct. 25, 2013.

*Primary Examiner* — Chelsea E Stinson
(74) *Attorney, Agent, or Firm* — Nelson Mullins Riley & Scarborough LLP (57) ABSTRACT

A method of manipulating thermoplastic film to create integrated features and particularly relates to an improved method of manufacturing a packaging bag that is reclosable after initial opening. Multiple sections of thermoplastic film are layered on top of themselves to form a multi-layer portion of the thermoplastic film. The multi-layer portion may then be conglomerated into a unitary thicker portion of the film that can then be shaped into a closure strip. In order to form a bag, a second such closure strip may be made. The two closure strips are then aligned and the remaining open portions of the bag are then sealed such that the closure strips form a reclosable opening that may be opened and closed repeatedly.

17 Claims, 8 Drawing Sheets

(51) Int. Cl.
*B31B 160/10* (2017.01)
*B31B 70/81* (2017.01)

(58) Field of Classification Search
USPC .................................. 493/213, 214, 121, 927
See application file for complete search history.

(56) References Cited

U.S. PATENT DOCUMENTS

| | | |
|---|---|---|
| 5,804,265 A | 9/1998 | Saad et al. |
| 5,937,615 A | 8/1999 | Forman |
| 6,550,966 B1 | 4/2003 | Saad et al. |
| 7,087,130 B2 | 8/2006 | Wu et al. |
| 7,712,962 B1 | 5/2010 | Reuhs et al. |
| 7,731,878 B2 | 6/2010 | Wood |
| 8,122,687 B2 | 2/2012 | Kinigakis et al. |
| 10,926,450 B2 * | 2/2021 | Huffer .................... B29C 53/36 |
| 2001/0010253 A1 | 8/2001 | Forman |
| 2012/0087602 A1 | 4/2012 | Hui |
| 2014/0345088 A1 | 11/2014 | Kobayashi et al. |

FOREIGN PATENT DOCUMENTS

| | | |
|---|---|---|
| WO | 9849062 | 11/1998 |
| WO | 03035498 A1 | 5/2003 |

\* cited by examiner

METHOD OF MAKING A PLASTIC FILM WITH INTEGRATED ZIPPER CLOSURE, AND PLASTIC BAG HAVING AN INTEGRATED ZIPPER CLOSURE

CROSS-REFERENCE TO RELATED APPLICATIONS

This application is a divisional of U.S. patent application Ser. No. 13/584,931, filed Aug. 14, 2012, which is incorporated by reference herein in their entireties.

BACKGROUND OF THE INVENTION

The present disclosure relates to a method of manipulating thermoplastic film to create integrated features and particularly relates to a method of manufacturing a packaging bag that is reclosable after initial opening.

A typical reclosable packaging bag comprises a bag body with a linear closure device, which forms a reclosable opening. Various approaches to manufacturing such bags have been developed or proposed, which generally entail forming the bag body from a plastic film to which a separately formed closure device is affixed. The bag body may be fabricated by a number of methods, including heat-sealing two sheets of thermoplastic film together to form a bottom seal and opposite side seals, or folding a single thermoplastic film to form the bottom of the bag and sealing the two opposing portions of film together at their side edges. The sealing is done so as to leave one side of the bag open, at which the closure device is provided.

The closure devices are typically composed of two interlocking strips, which allow the bag to be closed and reopened repeatedly. Typically this closure has been attached to the plastic film of the bag in one of several ways. In one approach, the two strips of the closure device are formed separately and are attached to the film by heat-sealing. In another approach, the strips are injection molded onto the film. Yet another approach extrudes the closure strips onto the thermoplastic film.

It can be difficult to ensure reliability of placement of separately formed or extruded closure strips onto the film, and the mechanisms required for doing so are relatively complex.

BRIEF SUMMARY OF THE DISCLOSURE

The present disclosure relates to a method of manipulating thermoplastic film to create integrated features, and particularly relates to an improved method of manufacturing a packaging bag that is reclosable after initial opening. In accordance with one aspect of the invention, multiple sections of thermoplastic film are layered on top of themselves to form a multi-layer portion of the thermoplastic film. The layering may be accomplished by folding the film in alternating opposite directions in an accordion style or by folding or rolling the film multiple times in the same direction.

The multi-layer portion is then conglomerated into a unitary thicker portion of the film. In one embodiment, the conglomerating step is accomplished by heating and applying pressure to the layered sections to form the thicker portion of the thermoplastic film. The thicker portion may then be formed into a closure strip either concurrently with or after the conglomeration process. The process of shaping the closure strip may be performed using heat and either pressure or vacuum. Typically the strip can be shaped by heated dies operating in either a continuous or an intermittent, discrete manner.

In order to form a bag, a second such closure strip may be made that interlocks with the first closure strip. The second strip may either be on the opposite side of the same piece of thermoplastic film as the first closure strip, or it may be part of a separate discrete piece of film. In the first case, the piece of thermoplastic film is folded in a C-fold configuration so as to align the closure strips, and in the latter case, the two pieces of thermoplastic film are aligned such that the closure strips are aligned. The remaining open portions of the bag are then sealed such that the closure strips form a reclosable opening that may be opened and closed repeatedly. A peel seal optionally may be provided adjacent to the closure device to give the bag a tamper-evident feature.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

DETAILED DESCRIPTION OF THE DRAWINGS

The present invention now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

The following description of certain preferred embodiments of the invention relate to a reclosable bag formed out of a thermoplastic film and having a closure device to allow the bag to be opened and reclosed repeatedly. The object of the present invention is to create the closure device out of the thermoplastic film itself, as opposed to manufacturing it separately and attaching it to the film afterwards. In one preferred embodiment, the closure device is formed from two interlocking strips positioned on opposite sides of a reclosable opening in the bag. In a preferred embodiment, each of the strips of the closure is formed out of the thermoplastic film itself. Each of the strips of the closure can be formed by layering sections of the thermoplastic film onto itself, and conglomerating the layers of the film together to form a unitary thickened portion of the film. Each thickened portion is then shaped, using heat with either pressure or vacuum, to form the thickened portions into interlocking closure strips. The process finally entails forming a bag out of the film material in such a manner that the closure strips can close an open end of the bag. While it is preferable to provide a linear closure device, nonlinear variations are also envisioned. The present invention can be practiced using numerous combinations, configurations, and sequences to manufacture the reclosable bag. Certain preferred embodiments are described below.

Figure 1:
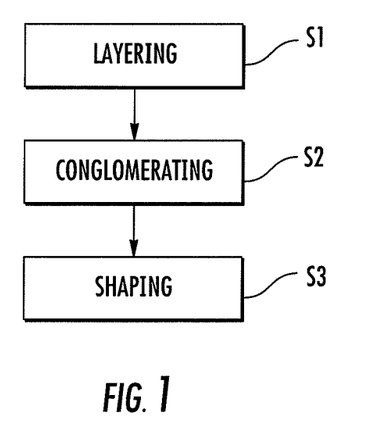
FIG. 1 is a block diagram illustrating a process in accordance with one embodiment of the present invention.
Figure 2:
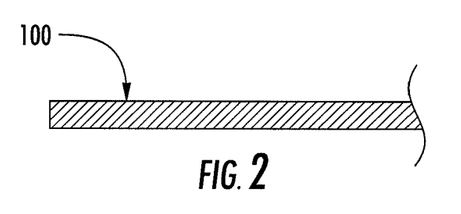
FIG. 2 is a cross-sectional view of an unlayered thermoplastic film in accordance with a starting configuration.
Figure 3:
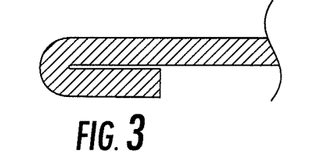
FIG. 3 is a cross-sectional view of the thermoplastic film after having been layered on top of itself once to form a two-layer portion.
Figure 4:
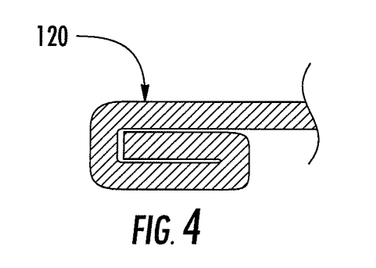
FIG. 4 is a cross-sectional view of the film after having been layered twice to form a three-layer portion.
Figure 5:
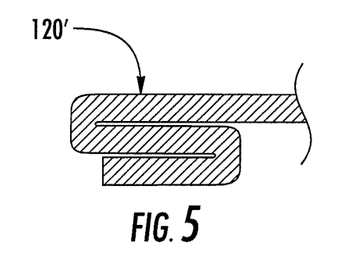
FIG. 5 is similar to FIG. 4 but shows an alternative way to form a three-layer portion.

With reference to FIGS. 1-10, one embodiment of a process for forming a closure strip in a thermoplastic film is now described. FIG. 1 is a process diagram showing the steps of the process, and FIGS. 2-10 illustrate the configuration of the film at each of various steps during the process. As shown in FIG. 2, a thermoplastic film 100 initially has a generally flat configuration. In the embodiment described below, an edge portion of the film 100 is processed to form a closure strip, but it will be recognized that the described process could be used to form a closure strip in a location other than adjacent to an edge of the film. As indicated in FIG. 1, a first step S1 of the process is to layer the film 100 onto itself, which generally entails folding the film to form a multi-layer portion 120 as shown in FIG. 4. The multi-layer portion 120 is shown as having three layers of film, formed by first folding the film once in a given direction (FIG. 3) and then folding those resulting two layers again in the same direction (FIG. 4), which may also be regarded as essentially rolling up the film. Alternatively, as shown in FIG. 5, a three-layer portion 120' can be formed by folding the film 100 back and forth (or in accordion fashion) in opposite directions. Additionally, as will be recognized, multi-layer portions of more than three layers can be formed in a similar rolling or back-and-forth fashion. The number of layers in the multi-layer portion 120 is the manufacturer's choice, depending on the needs of the particular application.

Figure 6:
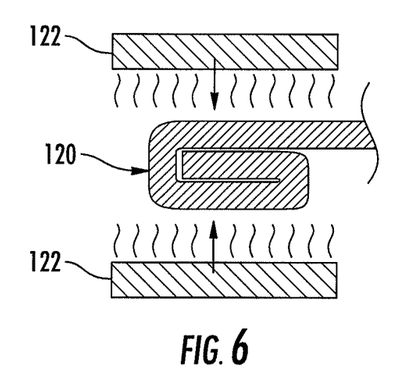
FIG. 6 depicts the three-layer portion of FIG. 4 being heated, so as to conglomerate the layers into one continuous thicker portion.
Figure 7:
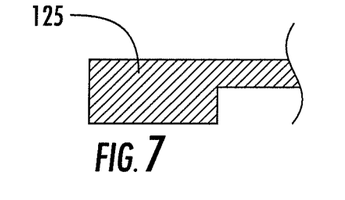
FIG. 7 is a cross-sectional view of one embodiment of the continuous thicker portion of thermoplastic film after being conglomerated.

As further indicated in FIG. 1, the next step S2 of the process is to conglomerate the layers of the multi-layer portion 120 so that they form a unitary thickened portion. This is illustrated in FIGS. 6 and 7. The multi-layer portion 120 is heated by one or more suitable heating devices 122 to soften the thermoplastic, and the heating devices exert pressure on the multi-layer portion to cause the softened layers of the multi-layer portion to be conglomerated into a substantially unitary thickened portion 125 as shown in FIG. 7. While FIG. 6 depicts a single conglomerating step in which the three layers of the multi-layer portion 120 are simultaneously conglomerated, alternatively the two-layer portion of FIG. 3 can be conglomerated, followed by folding or rolling to form the further-thickened multi-layer portion 120 or 120' of FIG. 4 or FIG. 5, followed by a second conglomerating step generally as shown in FIG. 6. More than two separate conglomerating steps can be used if the multi-layer portion has four or more layers.

Figure 8:
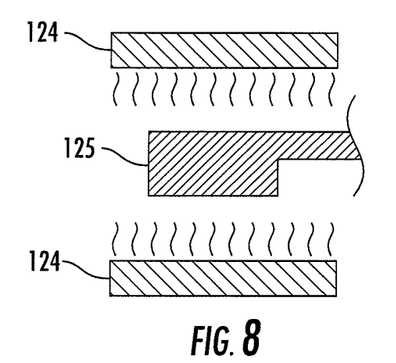
FIG. 8 illustrates the thicker portion of the thermoplastic film being heated so as to facilitate a subsequent shaping process.
Figure 9:
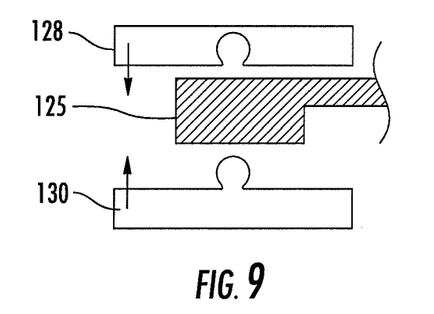
FIG. 9 depicts one embodiment of shaping dies being used to shape the thicker portion of thermoplastic film into a closure strip.
Figure 10:
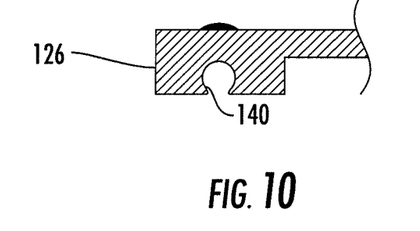
FIG. 10 is a cross-sectional view of one embodiment of a closure strip formed by the dies of FIG. 9.

As further indicated in FIG. 1, the next step S3 of the process is to shape the thickened portion 125 to form a closure strip. FIGS. 8 and 9 illustrate the shaping step. As shown in FIG. 8, one or more heating devices 124 are employed to heat and soften the thermoplastic of the thickened portion 125, and then shaping dies 128 and 130 (FIG. 9) are employed to shape the softened thickened portion 125, followed by cooling of the thermoplastic to set the shape, thereby forming a closure strip 126 as illustrated in FIG. 10. It will be appreciated that the very same devices could serve as both the heating devices 124 and the shaping devices 128, 130—i.e., the shaping dies 128, 130 could also be heated to effectively heat/soften the thermoplastic and shape it simultaneously. It is also within the scope of the present invention for the conglomerating step S2 and the shaping step S3 to be performed simultaneously by the same set of heated tools that simultaneously conglomerate the layers of the multi-layer portion 120 and shape the resulting thickened portion 125 into a closure strip 126. The layering, conglomerating, and shaping step(s) can be performed in a continuous fashion on a long length of thermoplastic film as it is advanced along a path without stopping, so as to create a continuous length of closure strip 126 in the film. Alternatively, the film can be intermittently advanced and stopped (or "indexed") so that the heating/shaping tools then engage the stationary film to heat and shape a discrete lengthwise portion of the thickened portion 125, with that process being repeated to create discrete closure strips 126 arranged end-to-end along the lengthwise direction of the film. In any case, the resulting closure strip 126 as shown in FIG. 10 has a female closure element 140. A similar process can be used to form a closure strip 127 having a male closure element 141 (FIG. 11), for example on another portion of the same thermoplastic film, or alternatively on another separate thermoplastic film, as further described below.

Figure 11:
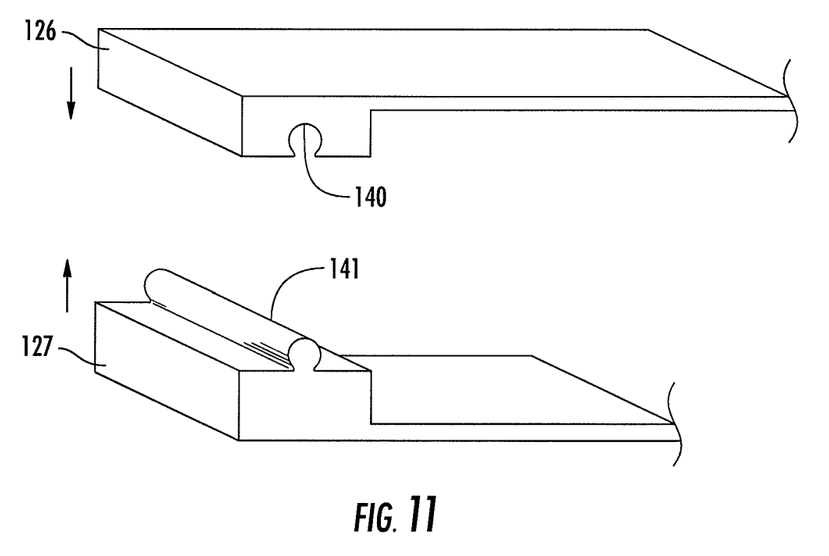
FIG. 11 is a perspective view of two interlocking closure strips formed by the process shown in FIGS. 8, 9, and 10.
Figure 12:
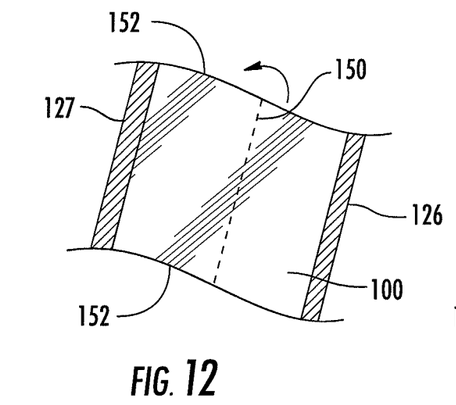
FIG. 12 is a perspective view of a single sheet of thermoplastic film having closure strips formed on opposing edges by the process in FIGS. 8, 9, and 10.
Figure 13:
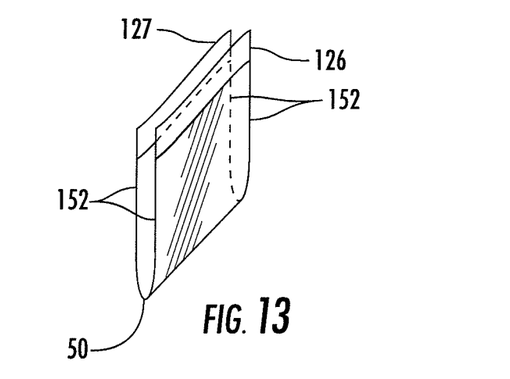
FIG. 13 is a perspective view of the sheet in FIG. 12 having been folded so as to align the closure strips.
Figure 14:
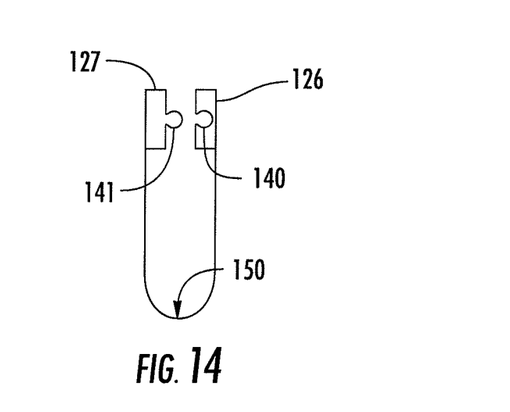
FIG. 14 is an edge-on view of the sheet depicted in FIG. 13.
Figure 18:
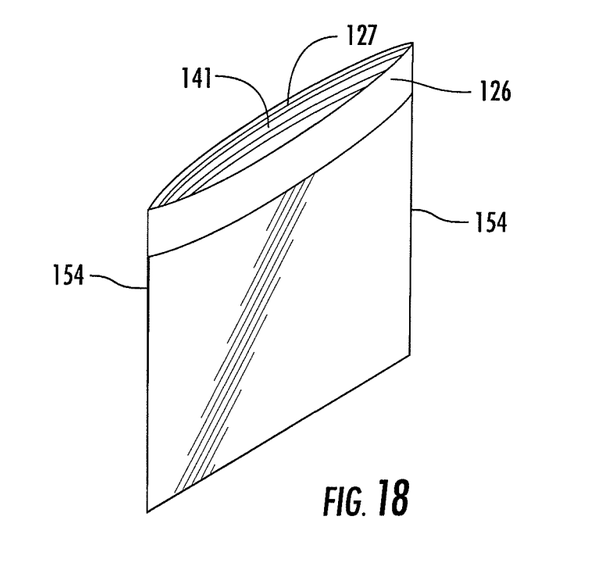
FIG. 18 is a perspective view of a completed bag in accordance with one embodiment of the invention.
Figure 19:
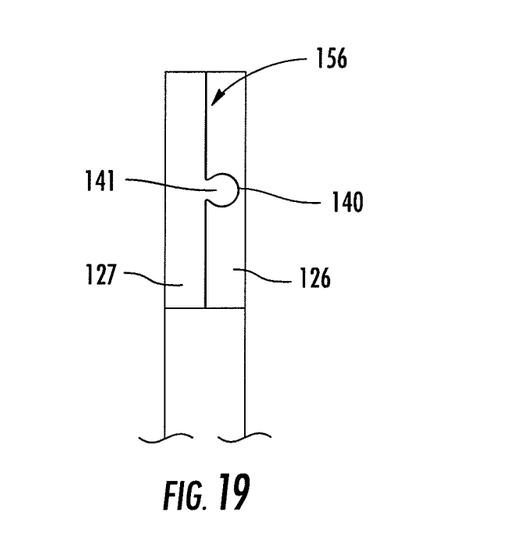
FIG. 19 shows a top seal and closure area of a bag in accordance with an embodiment of the invention.

When two portions of thermoplastic film have respective female and male (or otherwise interlocking) closure strips 126, 127 as shown in FIG. 11, the two portions can be connected by interlocking engagement of the two closure elements 140, 141. The film portions can be detached and reconnected repeatedly. Thus, when the closure strips 126, 127 are provided on a plastic bag, they can form a reclosable closure device for the bag. Bag constructions of various types are possible within the scope of the present invention, and some non-limiting examples are shown in FIGS. 12-18. As a first example, FIGS. 12-14 illustrate the formation of a bag from a single piece of thermoplastic film 100 having interlocking closure strips 126, 127 along opposite parallel edges thereof. The film 100 is folded along a fold line 150 located centrally between the closure strips to form a C-fold configuration as depicted in FIGS. 13 and 14. The resulting two opposing portions of the film are sealed together along their side edges 152 to form side seals 154 (FIG. 18). The two closure strips 126, 127 are interlocked with each other to close the top end of the bag. Optionally, the top end of the bag can also include a peelable heat seal or cold seal 156 located either outward or inward of the interlocked closure elements 140, 141, as depicted in FIG. 19. If the bag is to be filled with a product and then sealed closed and shipped to a retailer for sale to consumers, the product can be introduced into the interior of the bag in any of various ways (e.g., through a side opening before it is closed by formation of the side seal 154 at that side). Once the consumer receives the filled and sealed bag, the consumer can open the top by peeling apart the peel seal 156 and detaching the closure strips 126, 127 from each other. The bag is then reclosed by re-engaging the closure strips. Alternatively, the bag can be sold in an empty condition, for use by end users to contain any of various items.

Figure 15:
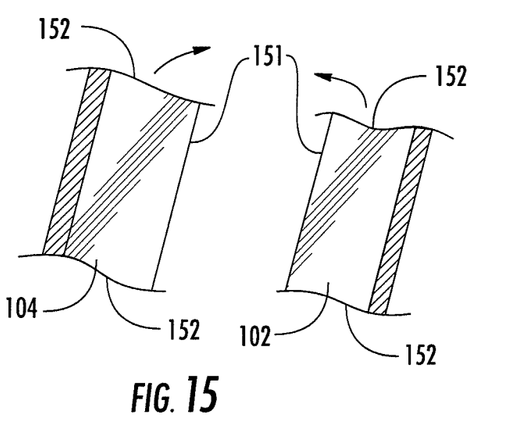
FIG. 15 is a perspective view of two sheets of thermoplastic film having closure strips formed on one edge of each sheet.
Figure 16:
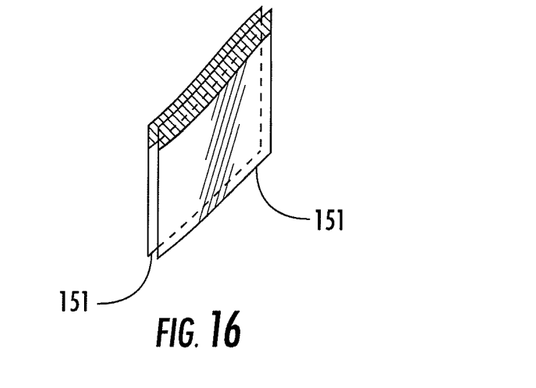
FIG. 16 is a perspective view of the sheets in FIG. 15 having been positioned so as to align the closure strips.
Figure 17:
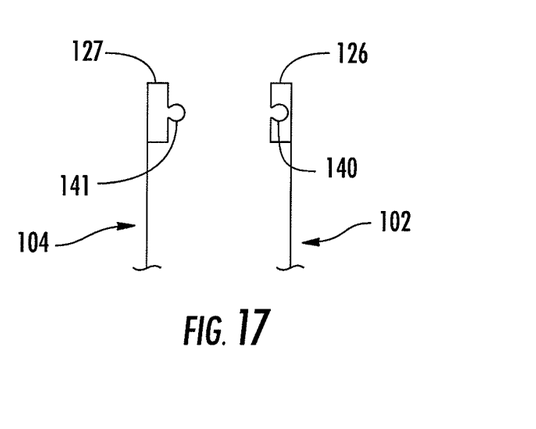
FIG. 17 is an edge-on view of the sheets depicted in FIG. 16.

An alternative type of bag construction is shown in FIGS. 15-17. The bag is formed from two discrete pieces 102 and 104 of thermoplastic film. The film piece 102 has a closure strip 126 along one edge, and the film piece 104 has a closure strip 127 along a corresponding edge thereof. The two film pieces 102, 104 are placed in opposing generally parallel relation and are sealed together along their side edges 152 to form side seals 154 (FIG. 18), similar to the previous embodiment, and along their bottom edges 151 to form a bottom seal. The closure strips 126, 127 are engaged (and optionally a peel seal 156 is formed) in the same manner as the previous embodiment.

Figure 20A:
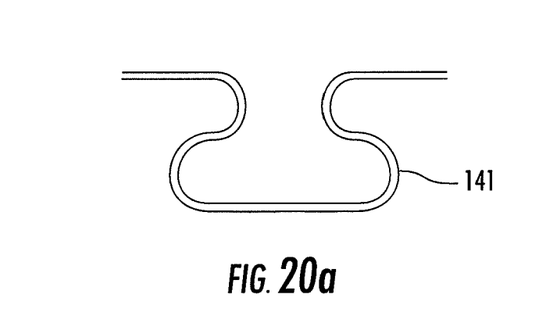
FIGS. 20a and 20b are cross-sectional views of interlocking male and female closure elements, respectively, in accordance with one embodiment of the invention.
Figure 20B:
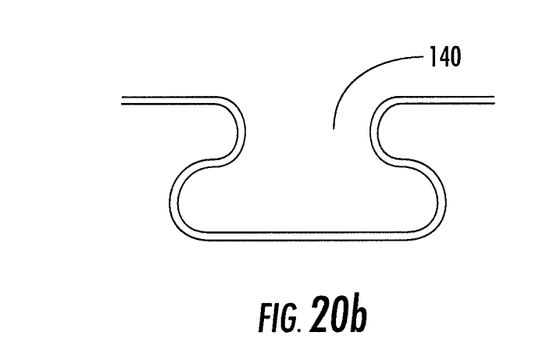
Figure 20C:
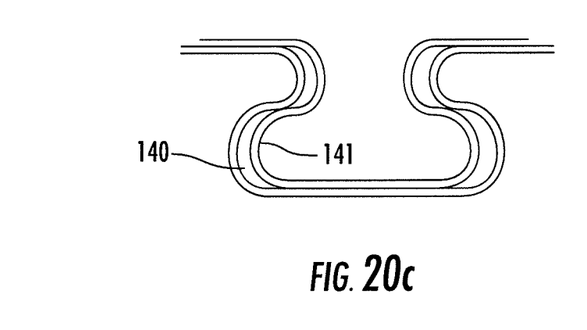
FIG. 20c shows the closure elements of FIGS. 20a and 20b interlockingly engaged with each other.
Figure 21A:
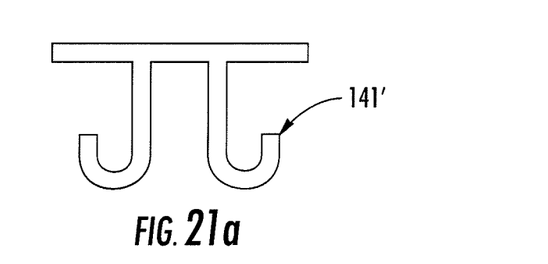
FIGS. 21a and 21b are cross-sectional views of another embodiment of the interlocking male and female closure elements, respectively, in accordance with one embodiment of the invention.
Figure 21B:
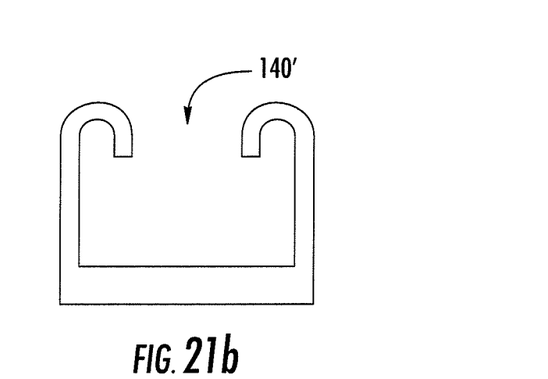
Figure 21C:
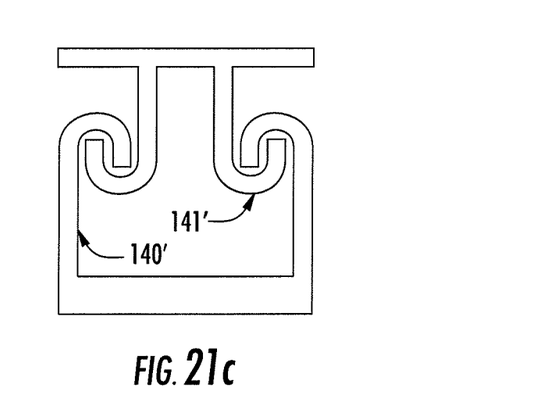
FIG. 21c shows the closure elements of FIGS. 21a and 21b interlockingly engaged with each other.

The closure elements 140, 141 of the closure strips 126, 127 may have any of a number of shapes that can interlock. Reclosable bags are used in applications that usually require their contents to be sealed so as to prevent leakage or contamination of the bag's contents. It is therefore preferred to provide interlocking closure strips 126, 127 that conform closely to each other's dimensions in order to provide a good seal. One exemplary interlocking closure device utilizing male 141 and female 140 closure elements of simple profiles is depicted in FIGS. 20a-c. FIGS. 21a-c depict a more-complex variation on the shape of the closure elements 140', 141'. These two exemplary profiles are illustrated only for explanatory purposes, and the invention is not limited to any particular profiles.

The film 100 used for making a rollstock with integral closure strip(s) in accordance with the invention can be a monolayer film or can be a laminate of two or more separate layers. In the case of a laminate that uses an adhesive for joining together adjacent layers, the adhesive should be flexible and extensible to allow the necessary deformations to occur during formation of the integral closure strip without delamination occurring between the layers. For example, a non-cross-linked adhesive can be used. An exemplary laminate that may be used in the practice of the invention comprises a cast oriented polypropylene (cast OPP) adhesively laminated to another cast OPP, optionally including an ink layer, such as cOPP/ink/adhesive/cOPP. The ink layer would be omitted of a transparent reclosable bag is desired.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method comprising:
   layering multiple first sections of thermoplastic film, wherein said multiple first sections are continuous and integral parts of said film, to form a first multi-layer portion;
   using a first heated shaping die to heat and apply pressure to said multiple sections of said first multi-layer portion to transform said first multi-layer portion into a unitary first thicker portion of said film and simultaneously shape the unitary first thicker portion into a first closure strip;
   layering multiple second sections of thermoplastic film, wherein said multiple second sections are continuous and integral parts of said film, to form a second multi-layer portion;
   using a second heated shaping die to heat and apply pressure to said multiple sections of said second multi-layer portion to transform said second multi-layer portion into a unitary second thicker portion of said film and simultaneously shape the unitary second thicker portion into a second closure strip; and
   placing the first and second closure strips in aligned positions allowing the closure strips to be engaged with each other to form a reclosable closure device.

2. The method of claim 1, wherein the first and second closure strips are integral parts of the same piece of thermoplastic film.

3. The method of claim 2, comprising folding the piece of thermoplastic film into a C-fold configuration that places the first and second closure strips in aligned positions.

4. The method of claim 3, further comprising sealing the first and second closure strips together along opposite side edges thereof so as to form a bag.

5. The method of claim 1, wherein the layering multiple second sections of thermoplastic film comprises folding the film multiple times in alternating opposite directions to form the second multi-layer portion having three or more layers.

6. The method of claim 1 wherein the heated shaping die heats and applies pressure to both sides of said multiple sections of said first multi-layer portion.

7. The method of claim 1 wherein the second heated shaping die heats and applies pressure to both sides of said multiple sections of said second multi-layer portion.

8. The method of claim 1 wherein said first closure strip is shaped by heating said first thicker portion and using vacuum.

9. The method of claim 1 wherein said second closure strip is shaped by heating said second thicker portion and using vacuum.

10. The method of claim 1, further comprising forming a peel seal adjacent to the reclosable closure device.

11. A reclosable closure device formed via the method of claim 1.

12. The method of claim 1, wherein the first and second closure strips are integral parts of two discrete pieces of thermoplastic film.

13. The method of claim 12, further comprising sealing a bottom edge and opposing side edges of the two discrete pieces of thermoplastic film thereof so as to form a bag.

14. The method of claim 1, wherein at least one of the multiple first sections and the multiple second sections are disposed adjacent an edge of the thermoplastic film.

15. The method of claim 1, wherein at least one of the multiple first sections and the multiple second sections are disposed in a location below the top edge of the thermoplastic film.

16. The method of claim 1, wherein at least one of the multiple first sections and the multiple second sections comprise at least three layers.

17. The method of claim 1 wherein the first closure strip comprises a male element and the second closure strip comprises a female element.

\* \* \* \* \*